United States Patent [19]

Lee

[11] Patent Number: 5,201,911

[45] Date of Patent: Apr. 13, 1993

[54] MOUNT FOR BICYCLE RACK

[76] Inventor: Douglas Lee, 8957 Sepulveda Blvd., Sepulveda, Calif. 91343

[21] Appl. No.: 765,667

[22] Filed: Sep. 26, 1991

[51] Int. Cl.⁵ .............................................. B60R 9/00
[52] U.S. Cl. ..................................... 224/321; 224/309; 224/322
[58] Field of Search .............. 224/321, 309, 314, 322, 224/325, 326, 323, 917, 315, 316, 317, 320, 327, 329, 330, 331

[56] References Cited

U.S. PATENT DOCUMENTS

| | | | |
|---|---|---|---|
| 3,064,868 | 11/1962 | Treydte | 224/330 |
| 4,372,469 | 2/1983 | Kowalski et al. | 224/321 |
| 4,588,117 | 5/1986 | Bott | 224/321 |
| 4,640,450 | 2/1986 | Gallion et al. | 224/331 |
| 4,757,929 | 7/1988 | Nelson | 224/320 |
| 4,770,329 | 9/1988 | Kamaya | 224/315 |

Primary Examiner—Henry A. Recla
Assistant Examiner—David J. Walczak
Attorney, Agent, or Firm—Roger A. Marrs

[57] ABSTRACT

A mount or stand-off device is disclosed herein constituting load carriers interposed between a load carrying rack and the longitudinal slats affixed to the roof of a motor vehicle. Two pairs of mounts are securely bolted to the longitudinal slats which conform to the vehicle and determine the load carrier's crossbar position. The existing vehicle roof slats that are utilized extend generally longitudinally on the vehicle and are of an integral part of the vehicle's horizontal surface.

1 Claim, 2 Drawing Sheets

MOUNT FOR BICYCLE RACK

BACKGROUND OF THE INVENTION

1. Field of the Invention

The present invention relates to a load carrier for automotive vehicles, and more particularly to a load carrier with mounting means to support the carrier on the vehicle's existing longitudinal slats located on the horizontal roof surface.

2. Brief Description of the Prior Art

Slat-type adjustable luggage carriers for automotive vehicles have become very popular. Examples of such article carriers are illustrated in U.S. Pat. Nos. 4,982,886; 4,754,905; 4,516,709; 4,261,496; 4,245,764; 4,239,139; 4,132,335; 4,099,658 and others. The present invention integrates the advantages of the slat-type adjustable article carrier with a unique load carrier capable of securing multi-sport rack systems accessories. This load carrier is securely fastened to the existing horizontal slats by mounting means which conform the rack or carrier crossbars to a vehicle's particular width and position.

Problems and difficulties exist with conventional sports rack or carrier devices, which stem largely from the fact that a variety of racks will not fit onto the roof slats of a vehicle. In some instances, straps with hooked brackets are used in combination with the rain gutter on the vehicle roof to hold down the rack or carrier. This device damages or marks the painted surface. Also, most prior racks or carriers are not theft-proof.

SUMMARY OF THE INVENTION

The present invention is a load carrier for motor vehicles with the mounting means for conforming to various widths and positions, being securely fastened on the roof of a vehicle to the existing longitudinal slats on the horizontal surface. Two pairs of brackets or mounts are securely bolted to the longitudinal slats which determine the correct width of the load carrier's crossbar and its fore and aft position. The existing slats that are utilized extend generally longitudinally on the vehicle's horizontal surface and are an integral part of the vehicle.

In one form of the invention, the pair of brackets each include a bracket having a foot portion attachable to the vehicle roof slat and a rack portion attachable to the underside of a load carrier or rack. The foot portion and the rack portion are rigidly held in fixed spaced-apart relationship by a vertical upright portion having its opposite ends integrally formed with the foot and rack portions respectively. The rack portion is provided with a hold-down having either a square or circular open-ended channel adapted to insertably receive bars or rods of the load carrier or rack. Securement means are provided for securing the foot portion to the slat and the rack portion to the rack bar or rod inserted through the channel.

Therefore, it is among the primary objects of the present invention to provide a novel mounting means for a load carrier which will conform to the various widths of different vehicles which have commercially successful slat-type article carriers as an existing integral part of the vehicle.

Another object of the present invention is to provide a novel mounting means operable with existing integral slats provided on the roof of a vehicle that provide a structurally sound base for the load carrier and which will conform to the various widths and positions of the slats on the roof of the vehicle.

Still another object of the present invention is to provide a novel mounting means for a load carrier which will prevent theft of the load carrier and articles placed on the mounting means interconnecting the load carrier with the roof slats of the vehicle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
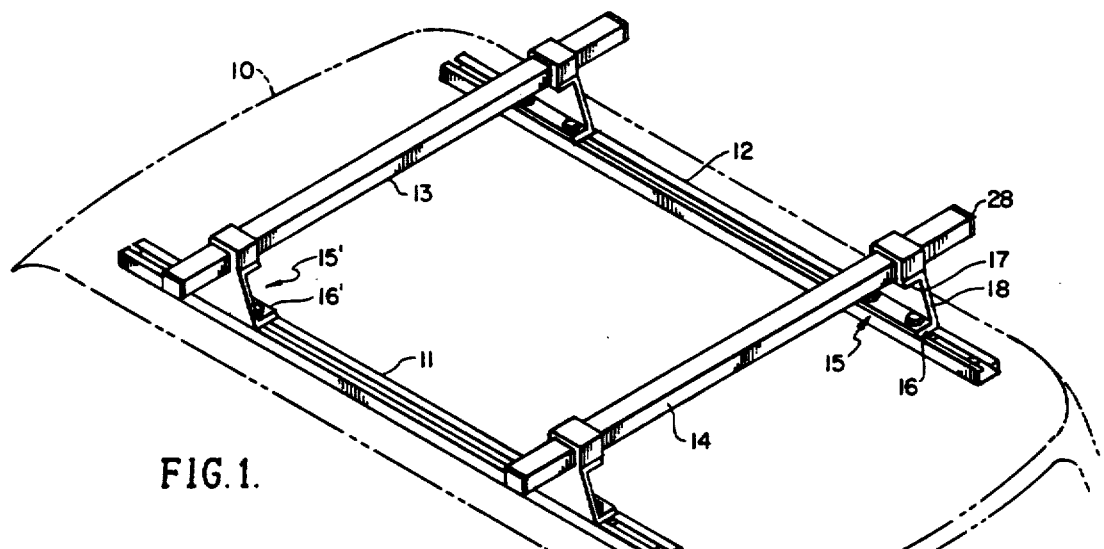
FIG. 1 is a front perspective view of the novel mounting means for securing the bars of a load carrier to the spaced-apart slats carried on the roof of a vehicle.

Referring to FIG. 1, a conventional vehicle is indicated by numeral 10 which includes a pair of parallel rails or slats 11 and 12, which are conventionally carried on the roof of the vehicle. The slats or rails are usually secured to the roof by conventional means, such as screws, bolts or the like. The slats or rails are employed for mounting a conventional rack, carrier, luggage or the like, and in the instance of sports articles, such as bicycles, a conventional rack may be employed which may utilize bars 13 and 14 which extend transversely across the vehicle roof so as to have its opposite ends terminate adjacent to the spaced-apart slats or rails 11 and 12.

In accordance with the present invention, mounting means or stand-offs are arranged in pairs for holding the rack structure 13 or 14 in fixed securement with the slats or rails. In general, a front pair and a rear pair of mounting means are provided wherein each pair includes a stand-off or bracket, such as indicated in the general direction of arrow 15 which comprises a foot portion 16 and a rack portion 17 connected together by means of an integral, upright intermediate portion 18. Inasmuch as the mounting means 15 are arranged in front and rear pairs, the rear pair of mounting means is indicated by the numeral 15' while the front pair is indicated by the numeral 15.

Figure 2:
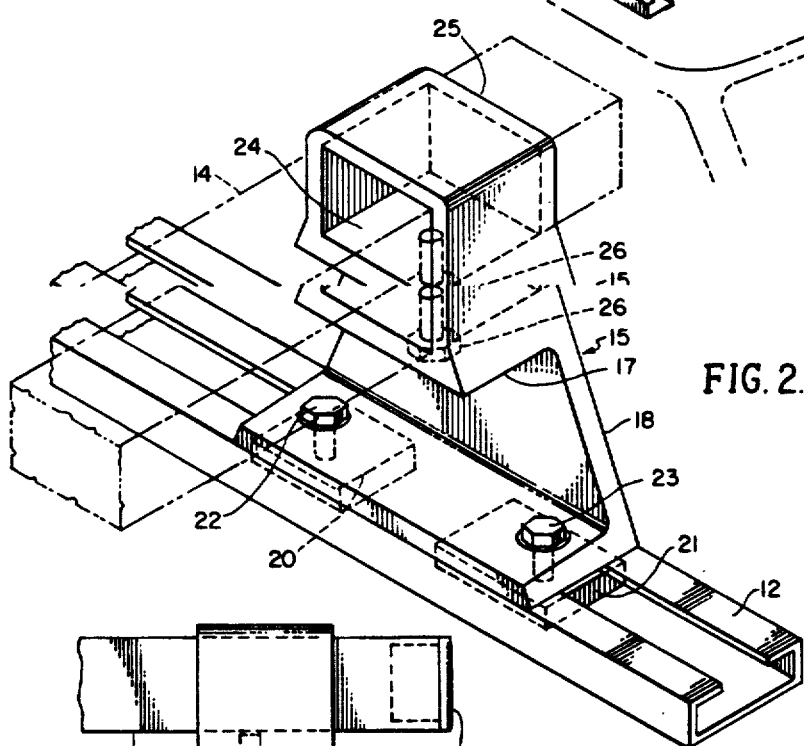
FIG. 2 is an enlarged perspective view showing the mounting means used in the embodiment of FIG. 1.
Figure 3:
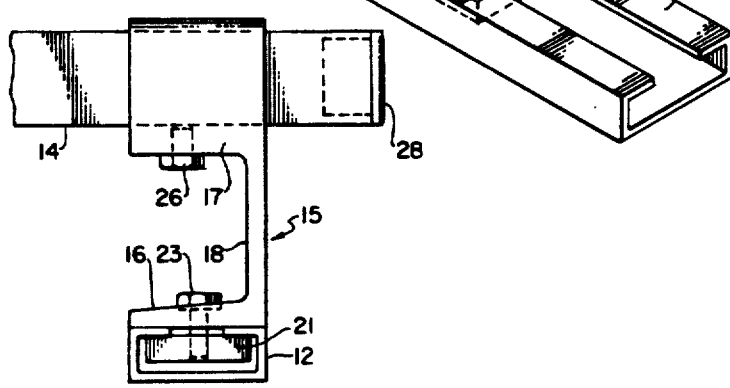
FIG. 3 is a front elevational view of the mounting means shown in FIG. 2.

Referring now in detail to FIGS. 2 and 3, it can be seen that the foot portion 16 is mounted on top of the rail 12 with attachment blocks 20 and 21 under the rails of the slat so that when bolts 22 and 23 are tightened, the underside of the foot portion and the attachment blocks will bear against the rails of the slat for securement.

FIGS. 2 and 3 also illustrate that the rack portion 17 includes an open-ended channel 24 defined within an attachment portion 25 intergrally formed with the rack portion 17. Attachment of portion 17 to the bar 14 is by means of a bolt 26 which is threaded through the rack portion 17 so that the end of the bolt bears against the underside of the rod 14. The extreme end of the rod may be capped by a plastic plug, as indicated by numeral 28.

It is to be particularly noted that the pair of mounting means for both the front and rear pairs are spaced laterally across the top or roof of the vehicle in fixed spaced-apart relationship. When the bars 13 or 14 are inserted into the respective channels of the mounting means, accommodation is automatically made for the width or distance between the slats 11 and 12. Therefore, a variety of bars on mounting racks or load carriers may be accommodated without the necessity for measuring or accounting for precise fit. Furthermore, it is noted that the securement is fixed and that the securement is theft-proof since complete disassembly of the mounting means would be necessary in order to remove the load carrier or any sports articles that may be carried thereon.

Figure 4:
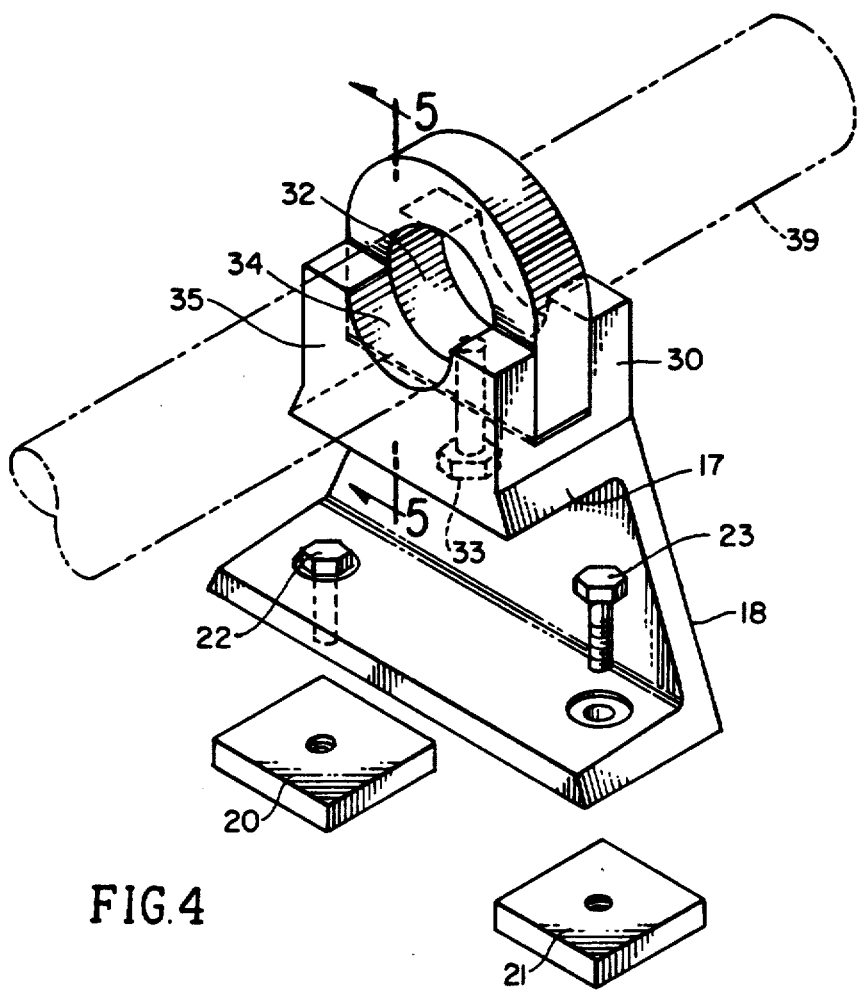
FIG. 4 is an exploded perspective view of another version of mounting means incorporating the present invention.
Figure 5:
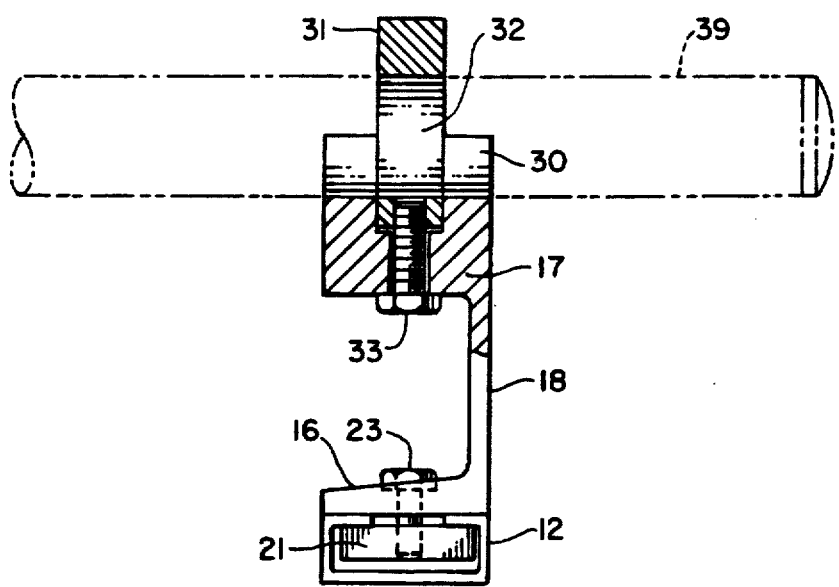
FIG. 5 is a transverse cross-sectional view of the mounting means shown in FIG. 4 as taken in the direction of arrows 5—5 thereof.

Referring now in detail to FIGS. 4 and 5, another embodiment of the invention is shown that is substantially similar to the mounting means shown in FIGS. 1-3 with the exception that the rack portion 17 includes a yoke 30 having a pair of leg members separated by a space which insertably receives an eyelet 31. The eyelet 31 includes an open-ended bore or channel 32 for insertably receiving a cylindrical element such as rod 39 forming a part of the load carrier in a fashion similar to the manner of bars 13 and 14 respectively.

As shown more clearly in FIG. 5, the eyelet 31 is secured to the yoke portion 17 by means of a securement screw or bolt 33. Furthermore, as shown in FIG. 4, the yoke 30 includes semicircular cutouts on each leg member such as cutout 34 associated with leg member 35. In this fashion, the cylindrical rod 39 may be inserted through the open-ended channel 32 and may also lie across the semicircular cutouts in each of the respective leg members of the yoke 30. The bolt 33 which is threaded into the lower end of the eyelet 31 retains the assembly together.

In view of the foregoing, it can be seen that the mounting means of the present invention, whether it takes the form of the bracket shown in FIG. 2 or FIG. 4, provide a novel means for mounting a load carrier or rack onto the rails or slats of the vehicle. Inasmuch as the bar or rod may be slid through the open-ended channels on either of the mounting means embodiments, the width of the rack or the width between the slats may be accommodated.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A sports rack mountable on the roof of a vehicle having parallel rails extending longitudinally along said roof, said rails having an upwardly directed channel with inwardly directed flanges along said channel;

a pair of elongated cross members for detachably carrying a sports article;

front and rear pairs of standoffs adapted to be secured to said parallel roof rails, said pair of elongated cross members slidably secured to said pairs of standoffs, respectively, whereby said elongated cross members are critically loaded on said roof to accommodate a fixed distance between said parallel rails;

each of said standoffs includes a base member and a top member integrally joined by a side member;

a pair of anchor elements disposed beneath each said base member and adapted to be slidably received in said channel and beneath said flanges of said rails;

an open-ended receptacle carried on each standoff top member for insertably receiving an end portion of a cross member; and p1 fasteners securing each of said receptacles to each of said cross members, respectively, and securing each of base members to each of said anchor elements, respectively, thereby securing said cross members to said vehicle.

* * * * *

UNITED STATES PATENT AND TRADEMARK OFFICE
CERTIFICATE OF CORRECTION

PATENT NO. : 5,201,911
DATED : April 13, 1993
INVENTOR(S) : Douglas Lee

It is certified that error appears in the above-indentified patent and that said Letters Patent is hereby corrected as shown below:

COLUMN 4

Line 22, "channel;" should read --channel, said sports rack comprising:--.

Signed and Sealed this

First Day of October, 1996

Attest:

BRUCE LEHMAN

Attesting Officer

Commissioner of Patents and Trademarks